United States Patent
Sharma et al.

(10) Patent No.: US 12,254,432 B2
(45) Date of Patent: Mar. 18, 2025

(54) SYSTEM AND METHOD FOR LEVERAGING A COMPLETENESS GRAPH

(71) Applicant: Intuit Inc., Mountain View, CA (US)

(72) Inventors: Aminish Sharma, Bangalore (IN); Anushrut Gupta, Bhopal (IN); Ashish Kumar Mishra, Bangalore (IN); Goutham Kallepalli, Hyderabad (IN); Manish Ramesh Shah, Bangalore (IN)

(73) Assignee: Intuit Inc., Mountain View, CA (US)

( * ) Notice: Subject to any disclaimer, the term of this patent is extended or adjusted under 35 U.S.C. 154(b) by 207 days.

(21) Appl. No.: 17/086,309

(22) Filed: Oct. 30, 2020

(65) Prior Publication Data

US 2022/0138644 A1 May 5, 2022

(51) Int. Cl.
*G06Q 10/0633* (2023.01)
*G06Q 10/0631* (2023.01)

(52) U.S. Cl.
CPC ... *G06Q 10/0633* (2013.01); *G06Q 10/06316* (2013.01)

(58) Field of Classification Search
CPC .................................................. G06Q 10/0633
See application file for complete search history.

(56) References Cited

U.S. PATENT DOCUMENTS

| 10,796,381 B1* | 10/2020 | Wang | G06Q 40/123 |
| 2018/0114274 A1* | 4/2018 | Wang | G06F 40/205 |
| 2019/0205792 A1* | 7/2019 | Huang | G06F 9/4881 |

OTHER PUBLICATIONS

X. Chen, S. Chen, J. Yao, H. Zheng, Y. Zhang and I. W. Tsang, "Learning on Attribute-Missing Graphs," in IEEE Transactions on Pattern Analysis and Machine Intelligence, vol. 44, No. 2, pp. 740-757, Feb. 1, 2022, doi: 10.1109/TPAMI.2020.3032189. (Year: 2022).*
X.Chen,S.Chen,J. Yao,H.Zheng,Y.Zhangandl.W.Tsang,"LearningonAttribute-MissingGraphs," inIEEETransactionsonPatternAnalysisandMachineIntelligence,vol. 44,No. 2,pp. 740-757,Feb. 1, 2022,doi:10.1109/TPAMI.2020.3032189.(Year: 2022) (Year: 2022).*
Learning on Attribute Missing Graphs (Year: 2022).*

* cited by examiner

*Primary Examiner* — Hafiz A Kassim
*Assistant Examiner* — Zahra Elkassabgi
(74) *Attorney, Agent, or Firm* — Lathrop GPM LLP

(57) ABSTRACT

A method of automating a workflow may include obtaining a completeness graph including conditions applied to attributes of an entity, determining that a missing attribute subset of the attributes lacks a corresponding value, determining that a condition corresponding to a missing attribute of the missing attribute subset is satisfied, and obtaining a value for the missing attribute. The value may be a result of performing a task in the workflow. The method may further include modifying a state of the entity by assigning the value to the missing attribute to obtain a modified state of the entity.

12 Claims, 8 Drawing Sheets

Workflow Automation
Completeness Graph
300

SYSTEM AND METHOD FOR LEVERAGING A COMPLETENESS GRAPH

BACKGROUND

Procedural models for business process (e.g., workflow) automation and/or data orchestration (e.g., obtaining values for fields of a complex online document) have several limitations. For example, workflows are typically modelled as sequential steps in an execution plan, requiring previous steps to be completed before continuing with the next step. Although some steps may be skipped, these scenarios are explicitly defined in the execution plan.

The workflows are defined externally to the domain of the system being managed, requiring the workflow engine and the system being managed to be continuously synchronized. The workflow engines maintain the state of each running workflow instance, resulting in data duplication and an increased possibility of inconsistencies between the knowledge of the system being managed and the workflow engine.

Error cases are explicitly handled by defining error handling rules and fallback options in the execution plan, resulting in a workflow definition process that is complex and unscalable. Since the workflow engine and the execution plan are external to the system being managed, changing one may produce incompatibility with the other.

Upgrading a workflow may require migration of running workflow instances to a new version, thereby increasing costs, causing the workflows to become vulnerable to inconsistencies, and causing the migration process to be unscalable (e.g., the complexity of migration becomes proportional to the number of running workflow instances).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method of automating a workflow including obtaining a completeness graph including conditions applied to attributes of an entity, determining that a missing attribute subset of the attributes lacks a corresponding value, determining that a condition corresponding to a missing attribute of the missing attribute subset is satisfied, and obtaining a value for the missing attribute. The value is a result of performing a task in the workflow. The method further includes modifying a state of the entity by assigning the value to the missing attribute to obtain a modified state of the entity.

In general, in one aspect, one or more embodiments relate to a system for automating a workflow including a computer processor, a repository configured to store a completeness graph including conditions applied to attributes of an entity, and a workflow engine executing on the computer processor and configured to determine that a missing attribute subset of the attributes lacks a corresponding value, determine that a condition corresponding to a missing attribute of the missing attribute subset is satisfied, and obtain a value for the missing attribute. The value is a result of performing a task in the workflow. The workflow engine is further configured to modify a state of the entity by assigning the value to the missing attribute to obtain a modified state of the entity.

In general, in one aspect, one or more embodiments relate to a method of orchestrating population of a document including obtaining a completeness graph including conditions applied to attributes of an entity, determining that a missing attribute subset of the attributes lacks a corresponding value, determining that a condition corresponding to a missing attribute of the missing attribute subset is satisfied, and obtaining a value for the missing attribute. The value for the missing attribute is used to populate a field in the document. The method further includes modifying a state of the entity by assigning the value to the missing attribute.

Other aspects of the invention will be apparent from the following description and the appended claims.

DETAILED DESCRIPTION

Figure 1A:
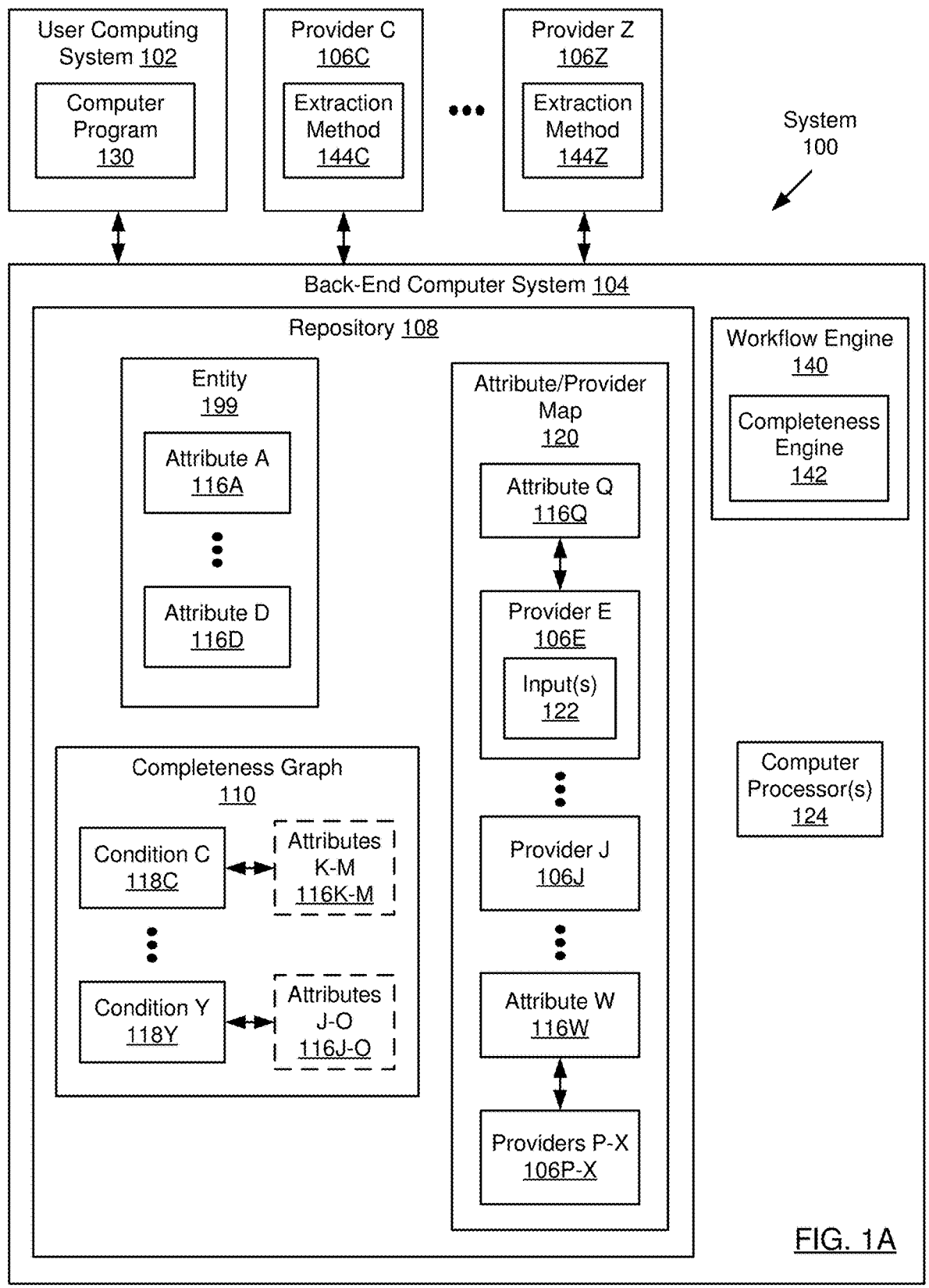
FIG. 1A, FIG. 1B, and FIG. 1C show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Procedural models for workflow automation and/or data orchestration incur a substantial overhead to synchronize the models with instances of the systems (e.g., workflows and documents) being managed. The overhead is in part due to defining the models externally to the systems being managed. In addition, the model definition process is complex and unscalable. For example, models are typically required to explicitly handle error cases by defining error handling rules and fallback options in the context of a predefined, sequential execution plan.

In general, systems in accordance with the disclosure are directed to using a completeness graph to support workflow automation and/or data orchestration. The completeness graph is a declarative (e.g., non-procedural) representation that is integrated with the systems being managed. In one or more embodiments, the completeness graph is a directed acyclic graph that defines the completeness of an entity (e.g., a complex system) in terms of rules applied to the state of the entity. The rules may define a workflow. The state of the entity may include values of attributes. The completeness graph may include conditions applied to one or more attributes. Attributes may be data sets to be fetched, roles (e.g., positions of individuals in an organization), permissions (e.g., approvals by individuals), etc. Conditions may be Boolean expressions, validation checks on the values of one or more attributes, etc. A condition may be a completion condition, which when satisfied, indicates that the state of the entity is complete and requires no further modification. Providers include functionality to provide values for attributes. For example, a provider may be an automated system or a user of a computer program. In the context of workflow automation, attributes may correspond to tasks in a workflow. In the context of data orchestration, attributes may correspond to fields in a document whose values may be extracted from different providers.

A decision-making algorithm makes a series of decisions to obtain values for missing attributes while traversing the completeness graph. Each decision is designed to move the entity closer to a state of completion. A value for a missing attribute may be obtained from a provider when it is determined that the conditions corresponding to the missing attribute are satisfied. The decision-making algorithm and the entity are mutually dependent. That is, the decision-making algorithm is driven by the evolving state of the entity, and the state of the entity is modified by executing the decision-making algorithm. Because the decision-making algorithm is not driven by any state external to the entity, there is no need to synchronize the decision-making algorithm relative to any external state. For example, a workflow may be updated simply by updating the state of the entity. The updated workflow may then automatically applied to executing instances of the workflow, in addition to new instances of the workflow.

Using a declarative completeness graph that is integrated with the entities being managed enables efficient, scalable model definition and/or modification. As a result, user productivity may be improved, potentially resulting in increased product engagement, positive customer ratings, and an increased sales. Such a capability may be marketed as a productivity enhancement feature.

FIG. 1A shows a diagram of a system (100) in accordance with one or more embodiments. As shown in FIG. 1A, the system (100) includes multiple components such as the user computing system (102), a back-end computer system (104), and providers (106C, 106Z). Each of these components is described below.

In one or more embodiments, the user computing system (102) provides, to a user, a variety of computing functionality. For example, the computing functionality may include word processing, multimedia processing, financial management, business management, social network connectivity, network management, and/or various other functions that a computing device performs for a user. The user may be a small business owner. Alternatively, the user may be a company employee that acts as a sender, a potential sender, or a requestor of services performed by a company (e.g., a client, a customer, etc.) of the user computing system. The user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computer system (102) may take the form of the computing system (500) shown in FIG. 5A connected to a network (520) as shown in FIG. 5B.

The user computing system (102) includes a computer program (130) in accordance with one or more embodiments. The computer program (130) is a software application written in any programming language that includes executable instructions stored in some sort of memory. The instructions, when executed by one or more processors, enable a device to perform the functions described in accordance with one or more embodiments. The computer program (130) may include a user interface (UI) (not shown) for receiving input from a user and transmitting output to the user. For example, the UI may be a graphical user interface or other user interface. The UI may be rendered and displayed within a local desktop software application or the UI may be generated by a remote web server and transmitted to a user's web browser executing locally on a desktop or mobile device. In one or more embodiments, the UI includes functionality to permit a user to construct and/or edit a completeness graph (110). For example, the UI may permit the user to construct and/or edit a completeness graph (110) by dragging and dropping icons representing different attributes. Continuing this example, the icons may be selected from various attribute templates. In one or more embodiments, the UI includes functionality to permit a user to construct and/or edit an instance of a workflow (150) and/or an instance of a document (160).

Continuing with FIG. 1A, the back-end computer system (104) may include a repository (108), a workflow engine (140) and computer processor(s) (124). The back-end computer system (104) may be executed on a computing system (500) shown in FIG. 5A connected to a network (520) as shown in FIG. 5B. The workflow engine (140) includes functionality to manage a workflow using a completeness engine (142). As described below, the completeness engine (142) includes functionality to obtain values for attributes that lack a corresponding value in the state of an entity (199) based on rules defined by the completeness graph (110).

The repository (108) is any type of storage unit and/or device (e.g., a file system, database, collection of tables, or any other storage mechanism) for storing data. Further, the repository (108) may include multiple different storage units and/or devices. The multiple different storage units and/or devices may or may not be of the same type or located at the same physical site. The repository (108) may be accessed online via a cloud service (e.g., Amazon Web Services, Egnyte, Azure, etc.).

The repository (108) includes functionality to store a completeness graph (110) and/or an attribute/provider map (120). The completeness graph (110) is a directed acyclic graph that defines the completeness of an entity (199) in terms of rules applied to the state of the entity (199). The rules may define a workflow. The state of the entity (199) may include values of attributes (116A, 116D). The completeness graph (110) may include conditions (118C, 118Y) applied to one or more attributes (116A, 116D). Examples of attributes may include: a data set to be fetched, a role (e.g., a position of an individual in an organization), a permission (e.g., an approval by an individual), a component of the state or feature of a system, etc. Each condition (118C, 118Y) may be applied to zero or more attributes (e.g., (116K, 116M), (116J, 116O)). For example, condition C (118C) may be applied to attributes (116K, 116M) and condition Y (118Y) may be applied to attributes (116J, 116O). Examples of conditions may include: a Boolean expression, a validation check on the values of attributes, etc. For example, the Boolean expression may require the existence of a value for an attribute X and that the value of an attribute Y satisfies a constraint (e.g., the constraint may be that the value of attribute Y exceeds $500). Alternatively, the Boolean expression may be a constant value (e.g., the value "true" or the value "false"). A condition (118C) may be a completeness condition, which when satisfied, indicates that the completeness graph (110) is complete. For example, a condition (118C) may include a "completion condition" flag, which when set, indicates that the condition (118C) is a completion condition. When a completion condition is satisfied, no further modifications to the state of the entity (199) are needed. Examples of modifications to the state of the entity (199) may include: adding or modifying an attribute (116A), assigning or modifying a value of an attribute (116A), etc.

The providers (106C, 106Z) include functionality to provide values for attributes. A provider (106C) may be an automated system that communicates via Hypertext Transfer Protocol (HTTP), REpresentational State Transfer (REST), Simple Object Access Protocol (SOAP), a message queue, or any other communication protocol. A provider (106C) may be invoked according to a schedule. For example, the provider (106C) may be invoked a predefined number of times for each periodic interval. As another example, the provider (106C) may be invoked repeatedly according to a calendar schedule. Alternatively, a provider (106C) may be a user (e.g., a user of a computer program (130)). For example, the user may provide the value of an attribute via email, or by entering the value of the attribute directly into the completeness graph (110) (e.g., via a GUI of the computer program (130)). Each provider (106C, 106Z) may include an extraction method (144C, 144Z) that specifies how to extract the value of an attribute from a response received from the provider (106C). For example, the extraction method may specify how to extract the value from a response received from an application programming interface (API) of the provider (106C). Continuing this example, the extraction method may specify a JavaScript Object Notation (JSON) path to be applied to a response represented in the JSON output.

The attribute/provider map (120) may include functionality to map attributes (116Q, 116W) to providers (e.g., (106E, 106J), (106P, 106X)). For example, the attribute/provider map (120) may map attribute Q (116Q) to providers (106E, 106J) and may map attribute W (116W) to providers (106P, 106X). In other words, a value of attribute Q (116Q) may be provided by any of providers (106E, 106J) and a value of attribute W (116W) may be provided by any of providers (106P, 106X). A provider (106E) may include input(s) (122). For example, the input(s) (122) may be parameters of an application programming interface (API) of the provider (106E). Continuing this example, one or more of the input(s) (122) may be required parameters of the API and one or more of the input(s) (122) may be optional parameters of the API. In one or more embodiments, a provider (106C) is not invoked when one or more of the required parameters is unavailable. For example, one or more of the required parameters may correspond to an attribute that lacks a corresponding value. In one or more embodiments, a workflow (150) may define a priority order to sequence tasks taken to obtain missing attributes.

The completeness engine (142) includes functionality to determine whether a condition C (118C) applied to attributes (116K, 116M) is satisfied. The completeness engine (142) includes functionality to obtain a value for an attribute (116A) from a provider (106C). The completeness engine (142) includes functionality to modify the state of an entity (199) (e.g., by assigning a value to an attribute (116A)).

In one or more embodiments, the computer processor(s) (124) takes the form of the computer processor(s) (502) described with respect to FIG. 5A and the accompanying description below. The computer processor (124) includes functionality to execute the workflow engine (140).

Figure 1B:
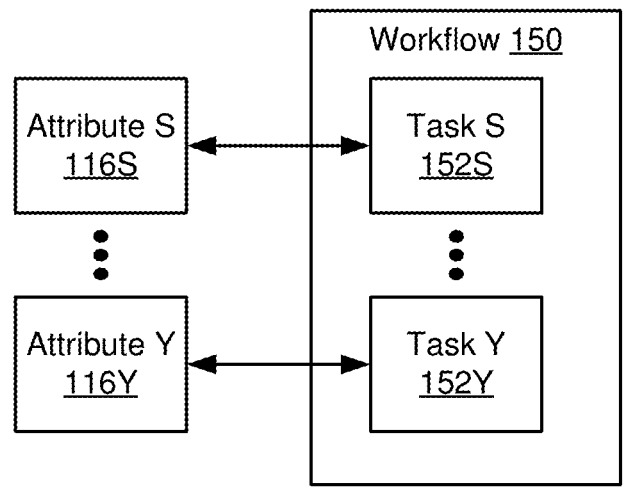

Turning to FIG. 1B, attributes (116S, 116Y) may correspond to tasks (152S, 152Y) in a workflow (150). A task (152S) may be a unit of work. The task (152S) may be performed by a provider. The output of the task (152S) may correspond to a value of the attribute (116S). In other words, performing the task (152S) may provide a value for the attribute (116S). A workflow (150) includes a collection of tasks (152S, 152Y). The workflow (150) may specify execution constraints that synchronize the execution of the tasks (152S, 152Y). For example, the execution constraints may specify that one task be performed before another task. The workflow (150) may define a priority order to sequence the tasks (152S, 152Y) performed to obtain values for attributes (116S, 116Y).

Figure 1C:
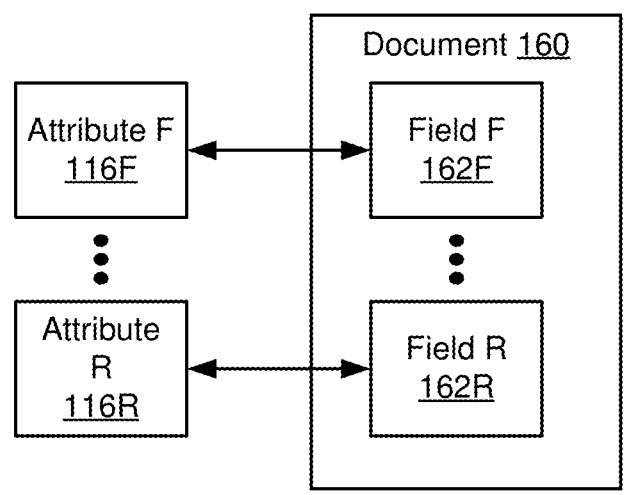

Turning to FIG. 1C, attributes (116F, 116R) may correspond to fields (162F, 162R) in a document (160). A document (160) is any type of written matter that captures information. The document (160) may be represented as a file using the Portable Document Format (PDF), HyperText Markup Language (HTML), eXtensible Markup Language (XML), JavaScript Object Notation (JSON), or any other file format. For example, a document (160) may be or include one or more of a form, a spreadsheet, a presentation, a word processing application document, or other such document. By way of an example, the document (160) may be a compliance form (e.g., audit form, data security form, tax form, medical form, privacy policy, etc.) to be completed by a user, and designed to comply with the regulations of a government agency. For example, the compliance form may be specific to a jurisdiction (e.g., a geographic region such as a state, country, region, municipality, reinvestment zone, etc.).

A document (160) includes fields (162F, 162R). A field (162F) is a discrete component of the document (160) that may be displayed when the document is displayed in a user interface (e.g., a user interface of the computer program (130)). For example, a field (162F) may be a chunk of text.

While FIG. 1A, FIG. 1B, and FIG. 1C show configurations of components, other configurations may be used without departing from the scope of the invention. For example, various components may be combined to create a single component. As another example, the functionality performed by a single component may be performed by two or more components.

Figure 2A:
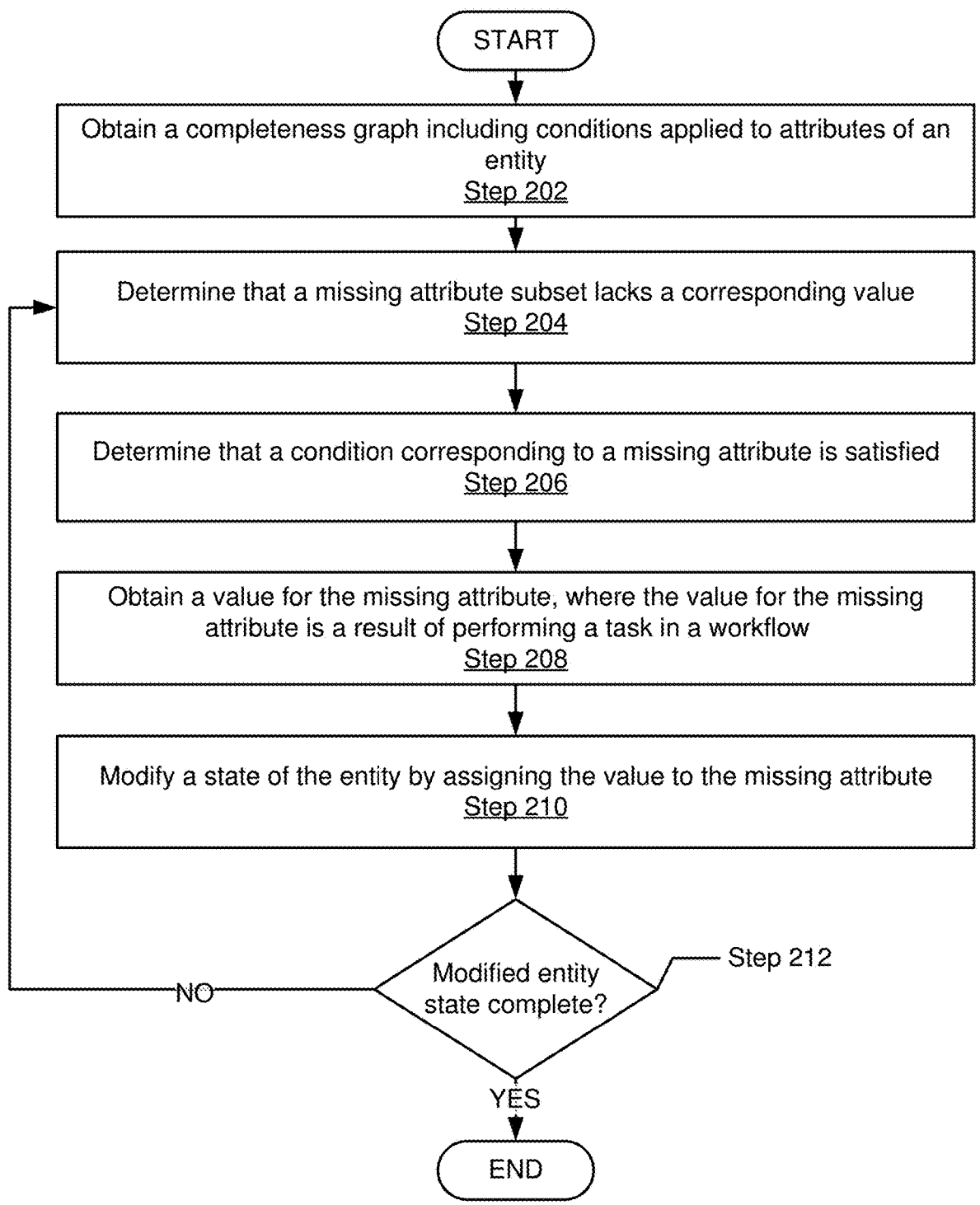
FIG. 2A and FIG. 2B show flowcharts in accordance with one or more embodiments of the invention.

FIG. 2A shows a flowchart in accordance with one or more embodiments of the invention. The flowchart depicts a process for automating a workflow. One or more of the steps in FIG. 2A may be performed by the components (e.g., the workflow engine (140) and the computer program (130) of the system (100)), discussed above in reference to FIG. 1A. In one or more embodiments of the invention, one or more of the steps shown in FIG. 2A may be omitted, repeated, and/or performed in parallel, or in a different order than the order shown in FIG. 2A. Accordingly, the scope of the invention should not be considered limited to the specific arrangement of steps shown in FIG. 2A.

Initially, in Step 202, a completeness graph is obtained. The completeness graph includes conditions applied to attributes of an entity. The workflow engine may obtain the completeness graph from a repository. The completeness graph may be constructed and/or modified by a user of a computer program. For example, the completeness graph may be edited by the user via a graphical user interface (GUI) of the computer program.

In Step 204, it is determined that a missing attribute subset lacks a corresponding value. The completeness engine may determine that each missing attribute in the missing attribute subset lacks a corresponding value. For example, in FIG. 3A, if the completeness engine determines that the "invoiceId" attribute (302A), "customerApproval" attribute (302B), and "adminApproval" attribute (302C) lack a corresponding value, then the completeness engine may include the "invoiceId" attribute (302A), "customerApproval" attribute (302B), and "adminApproval" attribute (302C) in the missing attribute subset.

In Step 206, it is determined that a condition corresponding to a missing attribute of the missing attribute subset is satisfied. For example, the condition corresponding to the missing attribute may require the existence of a value for an attribute X and/or that the value of an attribute Y satisfies a constraint (e.g., the value of attribute Y exceeds $500). The completeness engine may select the missing attribute from the missing attribute subset by comparing distances between the missing attribute subset and one or more completion conditions in the completeness graph. For example, each distance may be based on a number of attributes and/or conditions (e.g., a number of nodes) in a path between the respective missing attribute and the respective completion condition in the completeness graph. Continuing this example, the completeness engine may select the missing attribute corresponding to the smallest distance to a completion condition. Thus, the completeness engine may select the missing attribute that brings the completeness graph closest to a state of completion.

In Step 208, a value for the missing attribute is obtained. The workflow engine may obtain the value for the missing attribute from a provider for the missing attribute. For example, the value for the missing attribute may be a result (e.g., an output) of the provider performing a task in the workflow. The workflow engine may identify the provider using an attribute/provider map. For example, the workflow engine may query the attribute/provider map with an identifier of the missing attribute to obtain the identifiers of one or more providers for the missing attribute. The workflow engine may obtain the value for the missing attribute by invoking an application programming interface (API) of the provider (e.g., an automated provider). Alternatively, the workflow engine may obtain the value for the missing attribute by sending a message to the provider (e.g., a human provider).

In one or more embodiments, attempting to obtain the value for the missing attribute from the provider creates additional dependencies in the completeness graph. For example, the API of an automated provider may require, as input, values for one or more missing attributes in the missing attribute subset. Continuing this example, the completeness engine may modify the completeness graph by adding a new condition to the completeness graph that requires the existence of values for the one or more missing attributes in order to comply with the requirements of the API of the provider.

When there are multiple providers for the missing attribute, the workflow engine may select a provider whose inputs correspond to attributes external to the missing attribute subset. In other words, the workflow engine may select a provider whose inputs, if any, correspond to attributes that already have corresponding values.

Workflow automation providers may act in an asynchronous fashion. For example, to obtain an administrator's approval, a provider may attempt to obtain a value for the missing attribute by sending an email to an administrator with a link for the administrator to click at the administrator's convenience. In one or more embodiments, the invocation of a provider may be scheduled (e.g., at periodic intervals). For example, scheduling the invocation of a provider may enable batching of several requests for attribute values to the provider.

In Step 210, the state of the entity is modified by assigning the value to the missing attribute to obtain a modified state of the entity. Assigning the value to the missing attribute may cause a completion condition in the completeness graph to be satisfied. The provider may assign the value to the missing attribute in the state of the entity. Alternatively, the workflow engine may assign the value to the missing attribute in the state of the entity.

If, in Step 212, the workflow engine determines that the modified state of the entity is complete, then the workflow automation process of FIG. 2A ends. That is, once the workflow engine determines that a completion condition of the modified state of the entity has been satisfied, the workflow engine may decide not to obtain values of other missing attributes in the missing attribute subset. The completeness graph may have multiple completion conditions. For example, one completion condition may be satisfied by the existence of a value of "true" for a customer approval attribute in an invoice processing completeness graph, and another completion condition may be satisfied by the existence of a value of "true" for an administrator rejection attribute.

Otherwise, if the workflow engine determines that no completion condition of the modified state of the entity is satisfied, then the workflow engine executes another iteration of the processing loop formed by Step 204, Step 206, Step 208, Step 210, and Step 212, and so on. For example, in the next iteration of the processing loop the workflow engine may:
1) in Step 204, recompute the missing attribute subset;
2) in Step 206, determine that a condition corresponding to a new missing attribute of the recomputed missing attribute subset is satisfied. For example, the condition may be satisfied as a result of assigning, in Step 210 above, in a previous iteration of the processing loop, the value to a previous missing attribute. Continuing this example, the new missing attribute may be dependent on the value of the previous missing attribute;
3) in Step 208, obtain a value for the new missing attribute; and
4) in Step 210, assign the value to the new missing attribute. The value for the new missing attribute may be a result of a provider performing a second task in the workflow.

Because the process of FIG. 2A is not driven by any state external to the completeness graph, there is no need to synchronize the workflow automation process relative to any external state. For example, a workflow may be updated simply by updating the completeness graph. The updated workflow may then automatically applied to executing instances of the workflow, in addition to any new instances of the workflow.

Figure 2B:
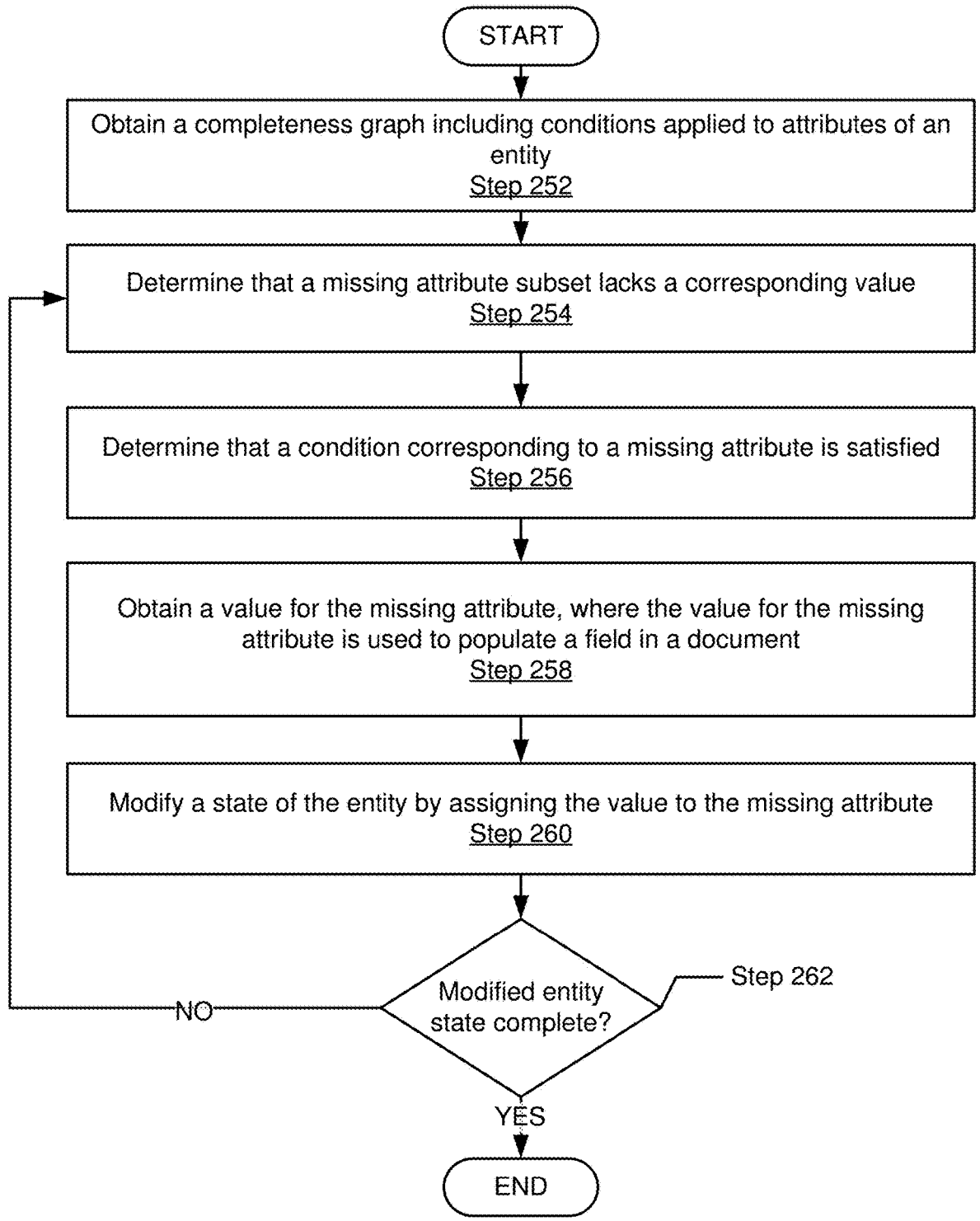

FIG. 2B shows a flowchart in accordance with one or more embodiments of the invention. The flowchart depicts a process for data orchestration. One or more of the steps in FIG. 2B may be performed by the components (e.g., the workflow engine (140) and the computer program (130) of the system (100)), discussed above in reference to FIG. 1A. In one or more embodiments of the invention, one or more of the steps shown in FIG. 2B may be omitted, repeated, and/or performed in parallel, or in a different order than the order shown in FIG. 2B. Accordingly, the scope of the invention should not be considered limited to the specific arrangement of steps shown in FIG. 2B.

Initially, in Step 252, a completeness graph is obtained (see description of Step 202 above).

In Step 254, a determination is made that a missing attribute subset of attributes lacks a corresponding value (see description of Step 204 above).

In Step 256, a determination is made that a condition corresponding to a missing attribute of the missing attribute subset is satisfied (see description of Step 206 above).

In Step 258, a value for the missing attribute is obtained (see description of Step 208 above). The workflow engine may use the value for the missing attribute to populate a field in a document. For example, the document may be a profile of a user where various user attributes are extracted from different providers. Continuing this example, the various user attributes for a small business user may include: customers of the user, payments of the user, industry code, category of product or service provided by the user, number of employees, monthly sales volume, company age in years, etc.

As the data orchestration providers provide values for the fields of the document, the data orchestration providers and/or the workflow engine may update the state of the entity until the state of the entity reaches a state of completion corresponding to the completion of the document. In contrast to workflow automation providers, data orchestration providers may act in a synchronous fashion to provide values for various fields of the document until the document is completed. For example, during data orchestration, it may be desirable to gather as many missing attributes as possible, as quickly as possible. Alternatively, data orchestration providers may act in an asynchronous fashion to achieve the goal state.

In Step 260, the state of the entity is modified by assigning the value to the missing attribute to obtain a modified state of the entity (see description of Step 210 above).

If, in Step 262, the completeness engine is configured to determine that the modified state of the entity is complete, then the first iteration of the data orchestration process of FIG. 2B ends (see description of Step 212 above).

Figure 3A:
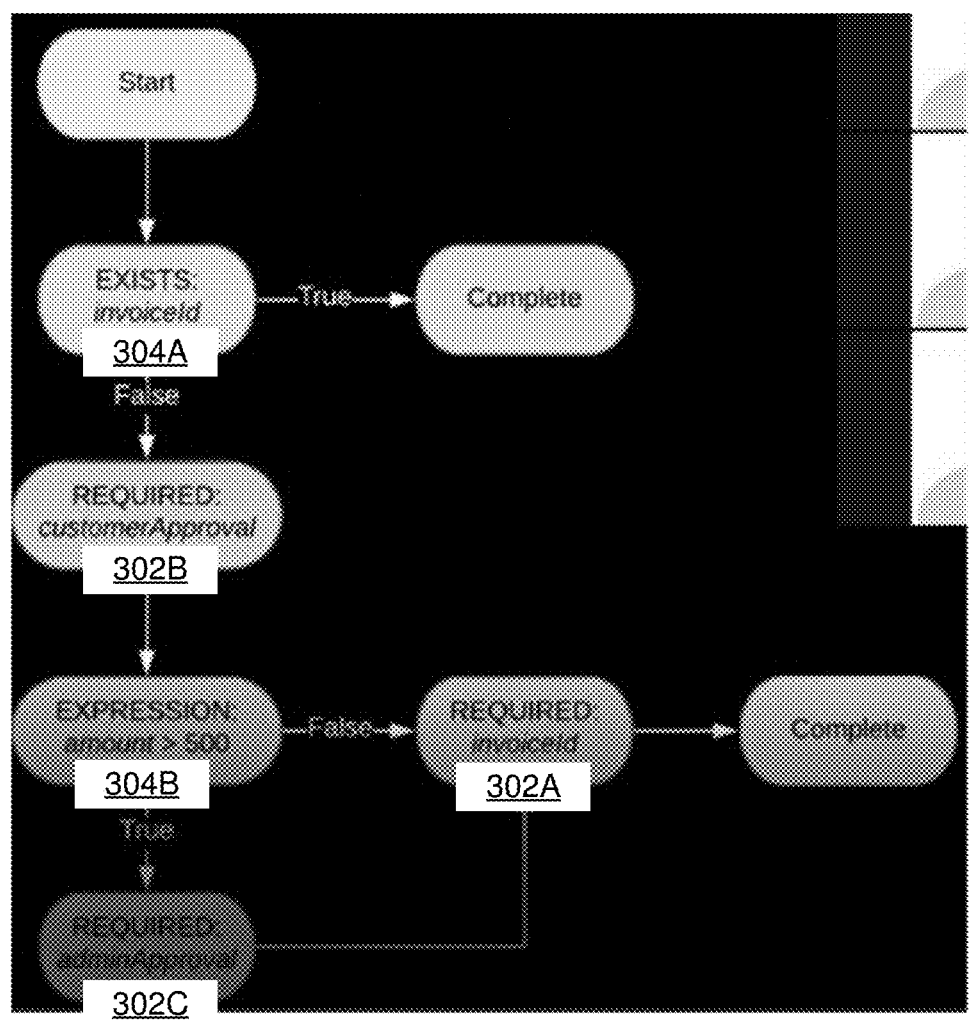
FIG. 3A, FIG. 3B, FIG. 4A, and FIG. 4B show examples in accordance with one or more embodiments of the invention.

The following example is for explanatory purposes only and not intended to limit the scope of the invention. FIG. 3A, FIG. 3B, FIG. 4A, and FIG. 4B show an implementation example in accordance with one or more embodiments of the invention. FIG. 3A shows a workflow automation completeness graph (300) ((110) in FIG. 1A) that includes conditions (304A, 304B) ((118C, 118Y) in FIG. 1A) applied to attributes (302A, 302B, 302C) ((116A, 116D, 116Q, 116W, 116K-M, 116J-O) in FIG. 1A, (116S, 116Y) in FIG. 1B, and (116F, 116R) in FIG. 1C).

Figure 3B:
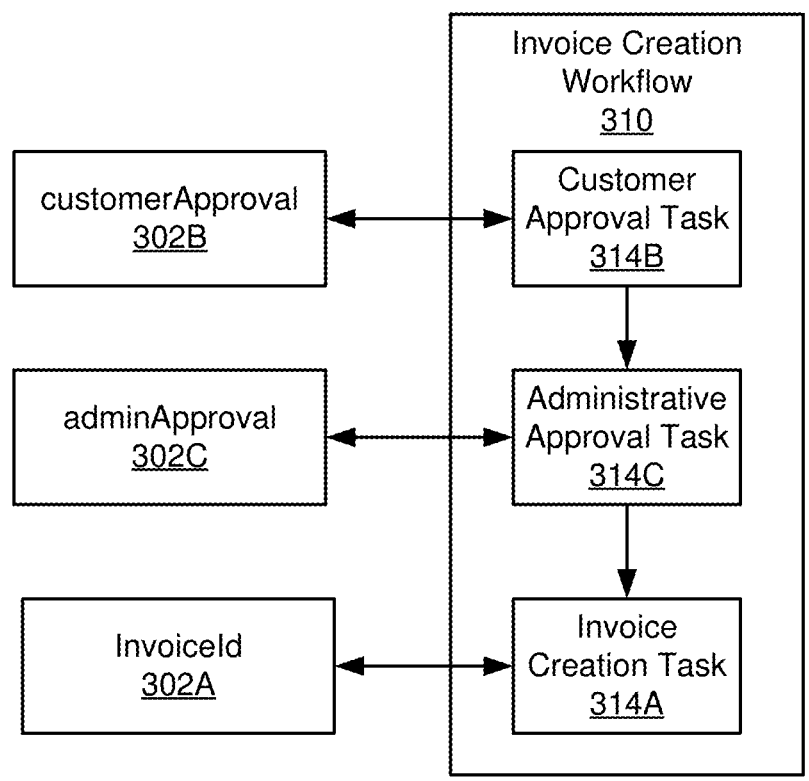

The completeness engine is configured to determine that the missing attribute subset includes each of the attributes (302A, 302B, 302C). The completeness engine then makes a determination that the "exists: invoiceId=false" condition (304A) corresponding to the "customerApproval" attribute (302B) is satisfied. Given that the condition (304A) corresponding to the "customerApproval" attribute (302B) is satisfied, the workflow engine then obtains a value for the "customerApproval" attribute (302B) from a provider, in this case, by sending a message to the customer requesting the customer's approval. The completeness engine is configured to determine that the customer is the provider for the "customerApproval" attribute (302B) by querying an attribute/provider map with an identifier of the "customerApproval" attribute (302B). The customer, upon receiving the message, performs a "customer approval task" (314B) ((152S, 152Y) in FIG. 1B) in an invoice creation workflow (310) ((150) in FIG. 1B), as shown in FIG. 3B. FIG. 3B also shows that the "customer approval task" (314B) corresponds to the "customerApproval" attribute (302B). In this case, performing the "customer approval task" (314B) sets the value of the "customerApproval" attribute (302B) to be "true".

Next, the completeness engine is configured to determine that the "amount>500" condition (304B) corresponding to the "adminApproval" attribute (302C) is satisfied. Given that the condition (304B) corresponding to the "adminApproval" attribute (302C) is satisfied, the completeness engine then obtains a value for the "adminApproval" attribute (302C) from an administrator, by sending a message to the administrator requesting the administrator's approval. The completeness engine makes a determination that that the administrator is the provider for the "adminApproval" attribute (302C) by querying the attribute/provider map with an identifier of the "adminApproval" attribute (302C). The administrator, upon receiving the message, is configured to perform an "administrative approval task" (314C) in the invoice creation workflow (sets the value of the "adminApproval" attribute (302C) to be "true".

Finally, the completeness engine makes a determination that each condition corresponding to the "invoiceId" attribute (302A) is satisfied. Given that each condition corresponding to the "invoiceId" attribute (302A) is satisfied, the completeness engine then obtains a value for the "invoiceId" attribute (302A) from the billing department, by sending a message to a contact person in the billing department. The workflow engine determines that the contact person in the billing department is the provider for the "invoiceId" attribute (302A) by querying the attribute/provider map with an identifier of the "invoiceId" attribute (302A). The contact person, upon receiving the message, performs an "invoice creation task" (314A) in the invoice creation workflow (310). In this case, performing the "invoice creation task" (314A) sets the value of the "invoiceId" attribute (302A) to be "invoice98765". Setting the value of the "invoiceId" attribute (302A) satisfies a completion condition of the workflow automation completeness graph (300), thus successfully completing the invoice creation workflow (310).

Figure 4A:
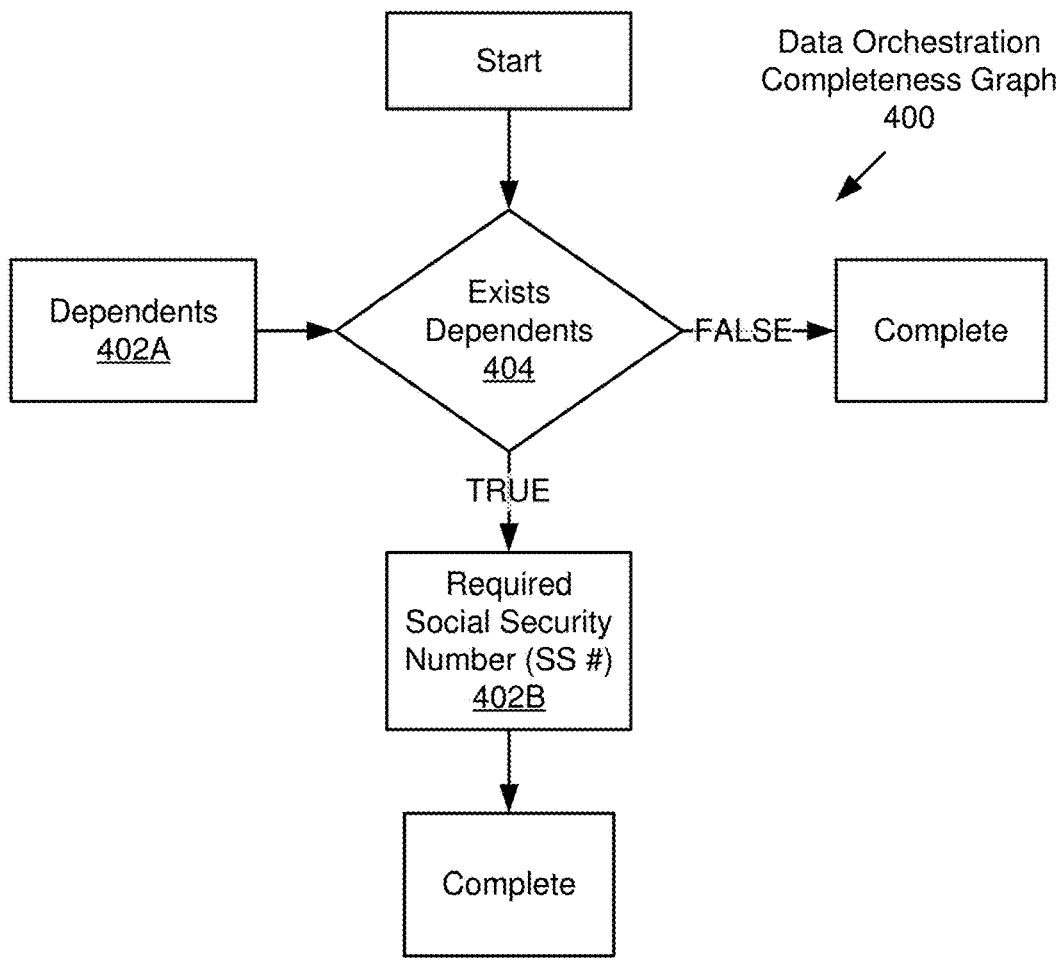
Figure 4B:
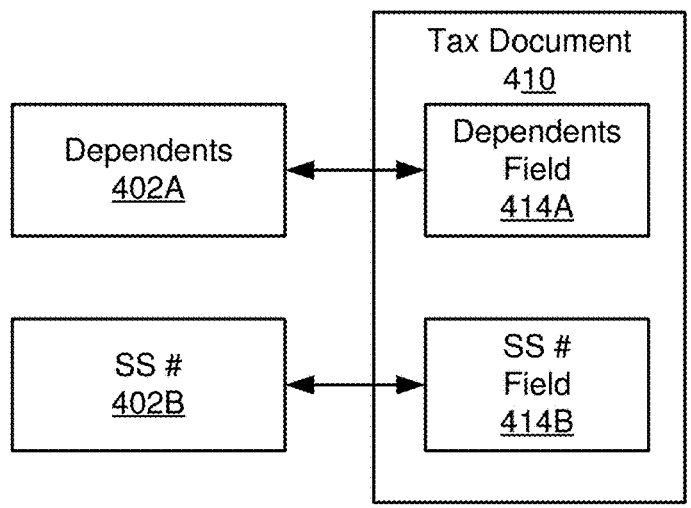

FIG. 4A shows a data orchestration completeness graph (400) that includes a condition (404) applied to attributes (402A, 402B). The completeness engine is configured to determine that the missing attribute subset includes the "social security number (SS #)" attribute (402B). The completeness engine then makes a determination that the "exists: dependents=true" condition (404) corresponding to the "SS #" attribute (402B) is satisfied. FIG. 4B shows that a tax document (410) for a user includes a "dependents" field (414A) corresponding to the "dependents" attribute (402A), as well as a "SS #" field (414B) corresponding to the "SS #" attribute (402B).

The workflow engine then obtains a value for the "SS #" attribute (402B) of the user's dependent from a provider, in this case, by invoking an application programming interface (API) of a database of social security numbers with the name of the dependent individual. The workflow engine is configured to set the value of the "SS #" attribute (402B) to be the SS # of the individual dependent on the user that was obtained from the database of social security numbers.

Setting the value of the "SS #" attribute (402B) satisfies a completion condition of the data orchestration completeness graph (400), thus successfully completing the data orchestration process.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5A:
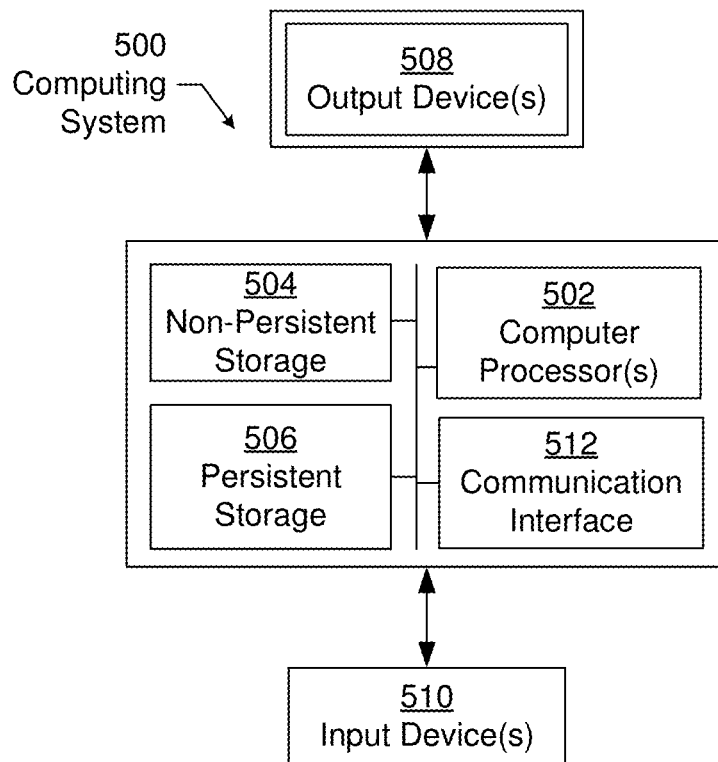
FIG. 5A and FIG. 5B show computing systems in accordance with one or more embodiments of the invention.
Figure 5B:
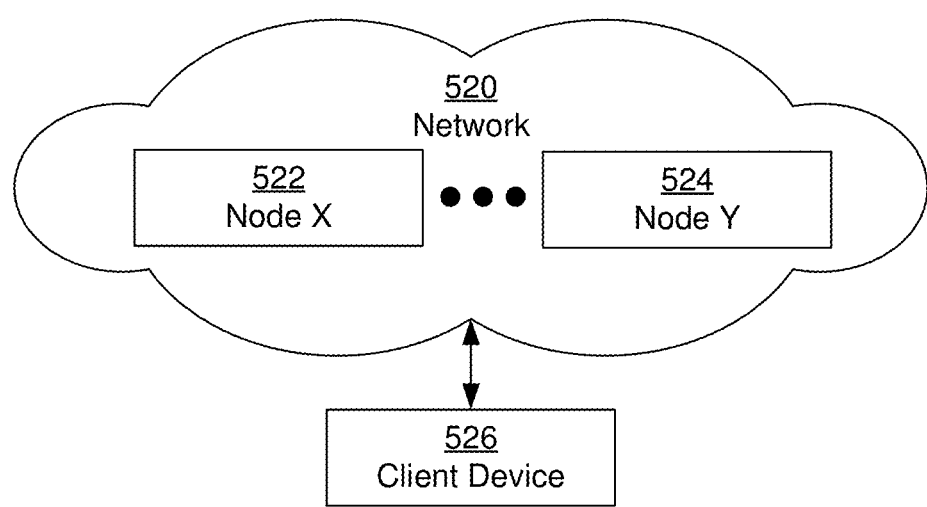

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of automating a workflow, comprising:
   receiving, by a network host associated with a uniform resource locator (URL) link, a first protocol request from a web client that allows a user selection of one or more graphical user interface (GUI) widgets comprising the URL link;
   obtaining, responsive to the first protocol request, a completeness graph comprising a plurality of conditions applied to a plurality of attributes of an entity, wherein the plurality of conditions comprises one or more completion conditions;
   sending, responsive to the first protocol request and by the network host, the completeness graph to the web client to cause a display of the completeness graph;
   generating, via a client device, the GUI including the user selection of the one or more GUI widgets includes editing or inserting the completeness graph, wherein the user selection of the one or more GUI widgets allows the user, via a second protocol request from the web client, to drag an icon selected from an attribute template, and drop the icon representing an attribute into the plurality of attributes;
   updating, responsive to the second protocol request, the completeness graph;
   receiving, by the network host, a third protocol request for displaying a document comprising a field;
   causing, responsive to the third protocol request and by the network host, a display of the document on the web client;
   determining, after updating the completeness graph, that a first missing attribute subset of the plurality of attributes lacks a corresponding value;
   executing a completeness engine using the first missing attribute subset to select one of a first missing attribute and a second missing attribute of the first missing attribute subset using a processor to compare a first distance from the first missing attribute to a first completion condition of the one or more completion conditions to a second distance from the second missing attribute to a second completion condition of the one or more completion conditions, wherein the first distance is based on a number of nodes in a path between the first missing attribute and the first completion condition;
   determining that a first condition of the plurality of conditions corresponding to the first missing attribute of the first missing attribute subset is satisfied;
   obtaining a first value for the first missing attribute, wherein the first value is a result of performing a first task in the workflow;
   modifying a state of the entity by assigning the first value to the first missing attribute to obtain a modified state of the entity; and
   updating the display of the field of the document responsive to the modified state of the entity.

2. The method of claim 1, further comprising:
   identifying for the first missing attribute, a provider that requires an input; and
   determining that the input corresponds to an attribute in the plurality of attributes that is external to the first missing attribute subset,
   wherein the first value for the first missing attribute is obtained from the provider in response to determining that the input corresponds to the attribute that is external to the first missing attribute subset.

3. The method of claim 1, further comprising:
   identifying for the first missing attribute, a provider that requires an input;
   determining that the input corresponds to the second missing attribute of the first missing attribute subset; and
   in response to determining that the input corresponds to the second missing attribute, adding to the completeness graph, a condition that requires a value for the second missing attribute.

4. The method of claim 1, further comprising:
   identifying for the first missing attribute, a first provider that requires a first input and a second provider that requires a second input;
   making a first determination that the first input corresponds to an attribute in the plurality of attributes that is external to the first missing attribute subset; and
   making a second determination that the second input corresponds to the second missing attribute of the first missing attribute subset,
   wherein the first value for the first missing attribute is obtained from the first provider in response to the first determination and the second determination.

5. The method of claim 1, further comprising:
   determining that the modified state of the entity is incomplete;
   in response to determining that the modified state of the entity is incomplete, determining that a second missing attribute subset of the plurality of attributes lacks a second corresponding value;
   in response to assigning the first value to the first missing attribute, determining that a second condition of the plurality of conditions corresponding to a second missing attribute of the second missing attribute subset is satisfied;

obtaining a second value for the second missing attribute of the second missing attribute subset, wherein the second value is a result of performing a second task in the workflow; and modifying the modified state of the entity by assigning the second value to the second missing attribute of the second missing attribute subset.

6. The method of claim 1, further comprising:
receiving from a user and via the GUI, a modification to the completeness graph.

7. A system for automating a workflow, comprising:
a computer processor;
a repository configured to store a completeness graph comprising a plurality of conditions applied to a plurality of attributes of an entity, wherein the plurality of conditions comprises one or more completion conditions; and
a workflow engine, executing on the computer processor and configured to:
  receive, by a network host associated with a uniform resource locator (URL) link, a first protocol request from a web client that allows a user selection one or more graphical user interface (GUI) widgets comprising the URL link,
  obtain, responsive to the first protocol request, the completeness graph,
  send, responsive to the first protocol request and by the network host, the completeness graph to the web client to cause a display of the completeness graph,
  generate, via a client device, the GUI including the user selection of the one or more GUI widgets includes editing or inserting the completeness graph, wherein the user selection of the one or more GUI widgets allows the user, via a second protocol request from the web client, to drag an icon selected from an attribute template, and drop the icon representing an attribute into the plurality of attributes,
  update, responsive to the second protocol request, the completeness graph,
  receive, by the network host, a third protocol request for displaying a document comprising a field,
  cause, responsive to the third protocol request and by the network host, a display of the document on the web client,
  determine that a first missing attribute subset of the plurality of attributes lacks a corresponding value,
  execute a completeness engine using the first missing attribute subset to select one of a first missing attribute and a second missing attribute of the first missing attribute subset using the computer processor to compare a first distance from the first missing attribute to a first completion condition of the one or more completion conditions to a second distance from the second missing attribute to a second completion condition of the one or more completion conditions, wherein the first distance is based on a number of nodes in a path between the first missing attribute and the first completion condition,
  determine that a first condition of the plurality of conditions corresponding to the first missing attribute of the first missing attribute subset is satisfied,
  obtain a first value for the first missing attribute, wherein the first value is a result of performing a first task in the workflow,
  modify a state of the entity by assigning the first value to the first missing attribute to obtain a modified state of the entity, and
  update the display of the field of the document responsive to the modified state of the entity.

8. The system of claim 7, wherein the workflow engine is further configured to:
identify, for the first missing attribute, a provider that requires an input, and
determine that the input corresponds to an attribute in the plurality of attributes that is external to the first missing attribute subset,
wherein the completeness engine obtains the first value for the first missing attribute from the provider in response to determining that the input corresponds to the attribute that is external to the first missing attribute subset.

9. The system of claim 7, wherein the workflow engine is further configured to:
identify, for the first missing attribute, a provider that requires an input,
determine that the input corresponds to the second missing attribute of the first missing attribute subset, and
in response to determining that the input corresponds to the second missing attribute, add, to the completeness graph, a condition that requires a value for the second missing attribute.

10. The system of claim 7, wherein the workflow engine is further configured to:
identify, for the first missing attribute, a first provider that requires a first input and a second provider that requires a second input,
make a first determination that the first input corresponds to an attribute in the plurality of attributes that is external to the first missing attribute subset, and
make a second determination that the second input corresponds to the second missing attribute of the first missing attribute subset,
wherein the completeness engine obtains the first value for the first missing attribute from the first provider in response to the first determination and the second determination.

11. The system of claim 7, wherein the workflow engine is further configured to:
determine that the modified state of the entity is incomplete,
in response to determining that the modified state of the entity is incomplete, determine that a second missing attribute subset of the plurality of attributes lacks a second corresponding value,
in response to assigning the first value to the first missing attribute, determine that a second condition of the plurality of conditions corresponding to a second missing attribute of the second missing attribute subset is satisfied,
obtain a second value for the second missing attribute of the second missing attribute subset, wherein the second value is a result of performing a second task in the workflow, and
modify the modified state of the entity by assigning the second value to the second missing attribute of the second missing attribute subset.

12. The system of claim 7, further comprising a graphical user interface (GUI) of a computer program configured to:

receive, from a user, a modification to the completeness graph.

\* \* \* \* \*